United States Patent [19]
Dyson

[11] 3,835,187

[45] Sept. 10, 1974

[54] PROCESS FOR PREPARING AROMATIC ACID CHLORIDES

[75] Inventor: Ian Fraser Dyson, Wilmington, Del.

[73] Assignee: E. I. du Pont de Nemours and Company, Wilmington, Del.

[22] Filed: Feb. 11, 1972

[21] Appl. No.: 225,617

[52] U.S. Cl............................................ 260/544 M
[51] Int. Cl............................................ C07c 63/14
[58] Field of Search ............................... 260/544 M

[56] References Cited
UNITED STATES PATENTS
1,557,154  10/1925  George........................... 260/544 M Primary Examiner—Lorraine A. Weinberger
Assistant Examiner—Richard D. Kelly

[57] ABSTRACT

Aromatic acid chlorides can be prepared in high quality and yield by a process comprising (1) reacting an aromatic compound bearing at least one trichloromethyl group with more than 1 and up to 1.25 molar equivalents of water or a lower monohydric alcohol per trichloromethyl group to convert the aromatic compound to an intermediate reaction product in which all trichloromethyl groups are converted to carbonyl-containing groups and (2) reacting the intermediate product from (1) with an aromatic compound bearing at least one trichloromethyl group in an amount which provides up to just enough $CCl_3$ groups to reconvert the carbonyl-containing groups other than COCl to COCl groups.

12 Claims, No Drawings

PROCESS FOR PREPARING AROMATIC ACID CHLORIDES

BACKGROUND OF THE INVENTION

1. Field of the Invention

This invention relates to a process for preparing aromatic acid chlorides. More specifically this invention relates to a process for making aromatic acid chlorides from aromatic trichloromethyl compounds.

2. Description of the Prior Art

It is known to prepare aromatic acid chlorides by reacting aromatic compounds having nuclear trichloromethyl groups with stoichiometric proportions of water or an alcohol.

Reaction products from these processes are often not of high quality because of operating variables in their production and they represent incomplete usage of valuable trichloromethyl compounds. Stoichiometric proportions of water reacted with trichloromethyl groups fail in a reasonable time to convert some of the trichloromethyl groups while converting some past the chlorocarbonyl stage to carboxylic acid and acid anhydride groups. Similarly stoichiometric proportions of an alcohol fail to convert some trichloromethyl groups while converting some past the chlorocarbonyl stage to ester and acid anhydride groups. The resulting aromatic acid chlorides must be separated from by-products by distillation. However, since some by-products, especially those with unconverted $CCl_3$ groups, have boiling points close to that of the aromatic acid chloride, the separation is difficult. For example, at 100 mm. Hg the following comparison of boiling points exists

| | |
|---|---|
| Isophthaloyl chloride | 195°C. |
| m-Trichloromethylbenzoyl chloride | 206°C. |
| m-bis(Trichloromethyl)benzene | 216°C. |

A similar temperature span exists for the corresponding para isomers.

In addition, commercial scale processes for producing aromatic acid chlorides from trichloromethyl compounds and stoichiometric proportions of water or alcohol are impractical because it is not possible at reasonable cost to avoid operating deviations from stoichiometric proportions which result in lowered process yield. The use of insufficient water or alcohol causes the formation of $CCl_3$ group-containing by-products. The use of excess water or alcohol causes the formation of high boiling by-products.

It is an object of this invention to provide a process which overcomes the problem of incomplete conversion of trichloromethyl aromatic compounds to the desired aromatic acid chlorides.

It is a further object to provide a process which produces a product from which the desired acid chloride is easily recovered in high yields and purity.

These and other objects of the invention will be apparent from the following descriptions and claims.

SUMMARY OF THE INVENTION

Now in accordance with the invention a process has been discovered for producing an aromatic acid chloride comprising reacting a first aromatic compound having 1–3 nuclear $CCl_3$ groups with an excess over 1.0 mole per each $CCl_3$ group of a compound of the formula ROH wherein R is hydrogen or $C_1$–$C_6$ alkyl the excess being up to 0.25 mole per each $CCl_3$ group until an intermediate product is formed in which all $CCl_3$ groups are converted to carbonyl-containing groups, some being COCl groups and some being by-product carbonyl-containing groups such as acid anhydride groups and reacting the intermediate product with a second aromatic compound having 1–3 nuclear $CCl_3$ groups in proportions providing a total number of $CCl_3$ groups not exceeding the total excess of ROH.

Thus, the process of this invention involves a reaction for the preparation of a benzene carbonyl chloride represented by the formula

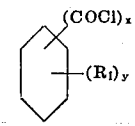

wherein $R_1$ is selected from alkyl, chloro, bromo, and fluoro; $x = 1$–3 and $y = 0$–5; the COCl groups being on nonadjacent carbon atoms when $x$ is 2 or 3; which comprises reacting a first substituted benzene compound having 1 to 3 nuclear $CCl_3$ groups and 0–5 substituents selected from COCl and $R_1$, the combined number of $CCl_3$ and COCl groups not exceeding 3 and the $CCl_3$ and COCl groups being on nonadjacent carbon atoms, with $1 + \mu$ moles per each $CCl_3$ groups of a compound of the formula ROH wherein $\mu$ is 0.02 to 0.25 and R is hydrogen or a $C_1$–$C_6$ alkyl at temperature sufficient to cause hydrogen chloride to be generated and to convert all the $CCl_3$ groups to carbonyl-containing groups, and reacting the reaction product with up to a molar proportion equal to the product of $\mu$ times the number of $CCl_3$ groups in the starting benzene compound of a second substituted benzene compound having 1–3 nuclear $CCl_3$ groups and 0–5 substituents selected from COCl and $R_1$, the combined number of $CCl_3$ and COCl groups not exceeding 3 and the $CCl_3$ and COCl groups being on nonadjacent carbon atoms, said molar proportion reduced 50 percent when the second compound has two nuclear $CCl_3$ groups and 66 ⅔ percent when the second compound has three nuclear $CCl_3$ groups.

More particularly, when $x$ in the aforesaid formula is 2, the process of this invention may be described as the process for the preparation of a benzene carbonyl chloride of the formula

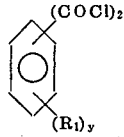

wherein $R_1$ is alkyl, Cl, Br or F and $y$ is 0–4, the COCl substituents being on nonadjacent carbon atoms of the benzene ring, which process comprises the steps:

a. reacting in a reaction mixture
1. a substituted benzene compound having $z_1$ $CCl_3$ groups, $z_1$ being 1–2, and 0–5 groups selected from COCl and $R_1$, the total number of $CCl_3$ and COCl groups not exceeding 2 and the 1–2 $CCl_3$ and any COCl groups being on nonadjacent carbon atoms of the benzene ring, and
2. for each mole of (1), $z_1(1+\mu)$ moles ($\mu$ is the amount in excess of the stoichiometric amount and is within the range 0.02–0.25) of a compound of the formula ROH wherein R is H or $C_{1-6}$ alkyl, at a temperature sufficient to produce HCl and to convert the $z_1$ $CCl_3$ groups to carbonyl-containing groups; and b. thereafter adding to the reaction mixture $z_1\mu_1/z_2$ mole ($\mu_1$ is 0.02 to $\mu$) of a substituted benzene compound as defined in (1) except that the number of $CCl_3$ groups is $z_2$, $z_2$ being 1-2, said compound being the same or different from that used in (a), and continuing the reaction until the reaction mixture is substantially free of compounds containing a $CCl_3$ group.

The following equations further illustrate the two stages of reaction where only one $CCl_3$ group is present.

First Stage

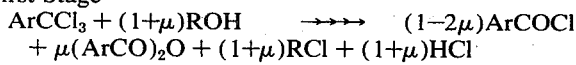

$ArCCl_3 + (1+\mu)ROH \longrightarrow (1-2\mu)ArCOCl + \mu(ArCO)_2O + (1+\mu)RCl + (1+\mu)HCl$ Second Stage

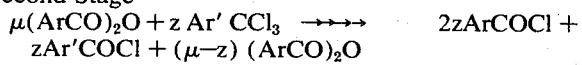

$\mu(ArCO)_2O + z\,Ar'\,CCl_3 \longrightarrow 2zArCOCl + zAr'COCl + (\mu-z)(ArCO)_2O$ wherein Ar is an aryl radical, $\mu$ is a value of excess ROH not over 0.25, ROH is water or a $C_1$–$C_6$ monohydric alcohol, z is a value not exceeding $\mu$ and Ar' is the same or a different aryl radical.

The process of this invention involves the overall complete conversion of trichloromethyl groups of an aromatic compound to chlorocarbonyl groups by reacting it past the formation of chlorocarbonyl groups to assure conversion of all trichloromethyl groups. Subsequently, the carbonyl-containing groups which have been converted past the chlorocarbonyl stage are reacted back to chlorocarbonyl groups. The process of the present invention enables one to easily separate by distillation the aromatic acid chloride formed.

It is entirely unexpected that recovery problems based on variations in process operation can be overcome by reacting a trichloromethyl compound with an intentional excess of water or alcohol and back-reacting the over-reacted by-product to produce an aromatic acid chloride easily separable in high yield and high purity by distillation because of the substantial absence of close-boiling $CCl_3$ group containing impurities in the process product.

The process of this invention can also be operated by removing the acid chloride from the intermediate reaction product, as by distillation before proceeding with the second stage. It is preferred, however, to operate both stages in the same reaction vessel without separating the acid chloride produced in the intermediate product to produce a product easily recoverable in high purity by a single distillation.

In the process of this invention, $CCl_3$ groups are completely converted in the first stage to carbonyl-containing groups, some of the converted groups being desired chlorocarbonyl and some being by-product carbonyl-containing groups such as acid anhydride groups. In the second stage the by-product carbonyl-containing groups are at least partly and preferably are almost completely eliminated by reaction with additional trichloromethyl groups, forming chlorocarbonyl groups from both the by-product groups and the additional $CCl_3$ groups. The acid chloride of this process is easily distilled from any residual acid anhydride remaining after the second stage.

The process of this invention is preferably conducted in the presence of a polyvalent metal halide catalyst. Representative examples of such catalysts include aluminum chloride, ferric chloride, stannic chloride, cupric chloride, zinc chloride and antimony pentachloride. Such catalysts, useful in the first reaction stage, are also useful in the second reaction stage to accelerate the conversion of over-reacted material to the desired acid chlorides. These catalysts are effective when used in amounts of from about 0.005 to 30 mole percent based on the initial trichloromethyl aromatic compound. The preferred amounts used are from about 0.05 to 1 molar percent based on the initial trichloromethyl aromatic compound.

Antimony pentachloride is the most preferred catalyst in this process. It is most preferably used in proportions in the range of from about 0.05 to 0.5 molar percent, based on the starting trichloromethyl compound.

When a mono(trichloromethyl) compound is used in the process of this invention, the intermediate reaction product comprises a benzoyl chloride and a benzoic anhydride. When the starting compound has two $CCl_3$ groups, the intermediate reaction product comprises a phthaloyl chloride and a bis(chlorocarbonyl)benzoic anhydride. When the starting compound has three $CCl_3$ groups, the intermediate reaction product comprises a 1,3,5-tris(chlorocarbonyl)benzene and the corresponding acid anhydride.

The first aromatic compounds or substituted benzene compounds of this invention contain one, two or three trichloromethyl groups located on nonadjacent carbon atoms. The preferred compounds of this invention contain 1 to 2 trichloromethyl groups. When two trichloromethyl groups are present, they must be meta or para to each other. When three trichloromethyl groups are present, they must be meta to each other. The hydrocarbon nucleus is benzene or naphthalene, preferably benzene. The hydrocarbon nucleus may bear further nuclear ring substituents in addition to the trichloromethyl groups described above. However, the preferred hydrocarbon nucleus contains only the trichloromethyl substituent. These other nuclear substituents are selected from the group consisting of alkyl, chloro, bromo, fluoro and chlorocarbonyl. However, the combined number of chlorocarbonyl and $CCl_3$ groups should not exceed 3, and all of these should be on nonadjacent carbon atoms. It will be appreciated that these other nuclear substituents (other than the $CCl_3$ groups) may number 0 to 5, preferably not more than 3. Among the nuclear substituents, other than $CCl_3$ groups, chloro is preferred. The most preferred aromatic compounds are 1,3-bis(trichloromethyl)benzene and 1,4-bis(trichloromethyl)benzene.

In the second reaction stage of the process of this invention a second aromatic compound is reacted with the reaction product from the first stage reaction. This aromatic compound is defined the same as the starting compounds for stage one. The second stage aromatic compound may be the same compound as the first stage aromatic compound or it may be different, but it should convert to the same acid chloride as the first aromatic compound is converted to.

Representative examples of the second aromatic compounds of this invention include 1,3-bis(trichloromethyl)benzene; 1,4-bis(trichloromethyl)benzene; meta-trichlorotoluyl chloride; para-trichlorotoluyl chloride; tris(trichloromethyl)-benzene; m-trichloromethylbenzoyl chloride; p-trichloromethylbenzoyl chloride; and the corresponding compounds bearing 1 to 3 ring-chloro substituents.

The first aromatic compounds of this invention are reacted with water or alcohol. The alcohols of the process of this invention are lower monohydric alcohols of 1 to 6 carbon atoms. Representative examples include methyl alcohol, ethyl alcohol, propyl alcohol, butyl alcohol, amyl alcohol and hexyl alcohol. Preferred are methyl and ethyl alcohol.

The amount of water or alcohol which reacts with the trichloromethyl aromatic compound in the first stage of this process should exceed the single molar proportion needed to convert each $CCl_3$ group to a $COCl$ group but should not be more than 1.25 molar proportions. Normally at least 1.02, preferably 1.03 molar proportions of water or alcohol are used per $CCl_3$ group. The preferred range is from 1.03 to 1.10 molar proportions of water or alcohol per $CCl_3$ group. Process operation consistency governs the actual value necessary.

The second reaction stage uses a trichloromethyl group-containing aromatic compound in an amount which provides up to enough $CCl_3$ groups to reconvert to chloro-carbonyl groups the carbonyl-containing groups other than chlorocarbonyl on compounds in the intermediate reaction product. Preferably less than just enough $CCl_3$ groups are provided, e.g., 30 to 90 percent of the excess of water or alcohol used in the first stage, to assure that the product of this second stage reaction is substantially all acid chloride with substantially no by-products containing unconverted $CCl_3$ groups. Most preferably 40 to 60 percent of the excess of water or alcohol is the amount of the second substituted benzene compound used. The second substituted benzene compound used is one convertible to an acid chloride having the same number of chlorocarbonyl groups as the intended acid chloride product. Where a dicarboxylic acid chloride product is desired, the second substituted benzene compound can be a bis(trichloromethyl) compound or a trichloromethyl acid chloride such as m- and p-trichloromethylbenzoyl chloride.

The process can be operated over a wide range of temperatures. The temperatures in the first and second stages are normally in the range of about 70° to about 240°C. The particular temperature depends on the catalyst used. Preferably with water the temperatures will range from 130° to 180°C., and with alcohol the temperatures will range from 140° to 220°C.

Progress of the reaction in each stage can be determined by infrared and vapor phase chromatography of the reaction mixture at any time. Such methods of analysis can be used to establish the time and temperature relation when the reaction is repeated.

The most preferred bis(trichloromethyl)benzenes of this process are readily prepared by side chain chlorination of m- or p-xylene and are well known in the art. One useful process disperses gaseous chlorine in liquid xylene in a fully baffled stirred tank reactor at 70° to 120°C. and at atmospheric pressure until the $\alpha,\alpha,\alpha,\alpha',\alpha',\alpha'$-hexachlorinated product is formed.

The following examples illustrate but do not limit the scope of the present invention. All references therein are to parts by weight unless otherwise specified.

EXAMPLE 1

Isophthaloyl chloride from 1,3-bis(trichloromethyl)benzene with water 1.39 Mole parts of water were added at 0.014 mole parts per minute to a mixture of 0.5 mole parts of 1,3-bis-(trichloromethyl)benzene (HCMX) and 0.00025 mole parts antimony pentachloride with stirring at 140°C. in a vessel provided with a reflux condenser. Hydrogen chloride was evolved during the addition.

During the water addition three samples of the reaction mass were taken — one after 9 minutes, one after 19 minutes, and one after 77 minutes — and were analyzed for infrared (IR) spectrum and by vapor phase chromatography (VPC).

When all of the water had reacted, solids started forming in the reaction mass. An additional 0.096 mole parts of HCMX were added as rapidly as possible to the reacted mass, dropping the temperature to 135°C. Reaction was evident only when the temperature was raised to 140°C. Evolution of hydrogen chloride occurred and the charge cleared up, leaving a slight amount of solids around the edge of the reaction mass. When the hydrogen chloride evolution ceased, a sample was then taken for IR and VPC.

Analyses were as follows:

| Time | % ICl | VPC RESULTS<br>% TCTC | % PCMX | % HCMX | % Unknown |
| --- | --- | --- | --- | --- | --- |
| 9 minutes | 3.94 | 15.93 | 0.28 | 79.68 | 0.17 |
| 19 minutes | 1.40 | 26.95 | — | 70.80 | 0.85 |
| 77 minutes | 44.26 | 53.12 | — | 1.57 | 1.05 |
| After Stage II | 98.92 | — | — | — | 1.08 |

ICl is isophthaloyl chloride.
TCTC is m-trichloromethylbenzoyl chloride.
PCMX is 1-(trichloromethyl)-3-(dichloromethyl)benzene, an impurity in HCMX.

IR analysis of the 19 minute sample showed the definite presence of the COOH group and anhydride group, accounting at least in part for the unknowns of the VPC analysis.

The reaction mass after Stage II, already having a high content of ICl, was easily distillable under vacuum at 10–50 mm. Hg to produce a cut of very pure ICl.

EXAMPLE 2

Stoichiometric proportions

A comparison run was made by adding one mole part of water at 2.7% per minute to a mixture of 0.5 mole part of HCMX and 0.0015 mole parts of antimony pentachloride at 140°C. in a vessel provided with a reflux condenser. A sample of the reaction mixture after all the water was added showed by VPC an analysis of 89.94% ICl, 9.67% TCTC and 0.06% HCMX.

EXAMPLE 3

Isophthaloyl chloride from 1,3-bis(trichloromethyl)benzene with interim recovery 0.42 Mole parts of water were added in small portions, each after consumption of the previous portion, to a mixture of 0.2 mole parts of 1,3-bis(trichloromethyl)benzene (HCMX) and 0.016 mole parts of antimony pentachloride with stirring at 70°C. under a reflux condenser. Changes in composition of the reaction mixture were followed by VPC analysis of the mixture samples during the reaction. When 0.401 mole parts of water had been added, the mixture still contained some m-trichloromethylbenzoyl chloride (TCTC) but after completing water addition the TCTC was absent. Addition required 5½ hours. The mixture was then heated one-half hour at 170°C.

Vacuum distillation of the reacted mixture at 15–17 mm. Hg produced 0.119 mole parts of ICl distilling over at 141°–144.5°C.

0.024 Mole parts HCMX were added to the distillation residue and the mixture was heated at 150°–170°C. for an hour. By vacuum distillation a further 0.089 mole parts ICl of good quality was recovered. This represents a yield overall of 94.0 percent.

EXAMPLE 4

In a stirred reaction vessel provided with a reflux condenser, 0.067 mole m-bis(trichloromethyl)benzene (HCMX) was heated to 150°C. 0.067 Mole methanol was added as rapidly as possible without flooding the reflux condenser during 15 minutes. The mixture temperature dropped to 120°C. during the addition with evolution of methyl chloride and hydrogen chloride during the methanol absorption.

0.001 Mole aluminum chloride was added and, thereafter an additional 0.093 mole methanol was added as rapidly as absorbed during 15 minutes. The mass was stirred 6 hours at 230°C. and then vacuum distilled at 50–100mm Hg. 0.0453 Mole isophthaloyl chloride was recovered, leaving behind a higher boiling residue. The residue was heated at 150° to 170°C. in 30 minutes with an additional 0.0064 mole of m-bis(trichloromethyl)-benzene (HCMX) and then vacuum redistilled. An additional 0.253 mole of isophthaloyl chloride was recovered for a total yield of 96 percent based on all HCMX used.

EXAMPLE 5

The following procedure, although not performed, further exemplifies the use of methanol in this process.

In a stirred reaction vessel provided with a reflux condenser, 0.2 mole p-bis(trichloromethyl)benzene (HCPX) is heated to 220°C. while being purged with dry nitrogen. 0.2 Mole methanol is added as rapidly as absorbed without flooding the reflux condenser during 25 minutes. Methyl chloride and hydrogen chloride are evolved during the methanol absorption.

0.01 Mole aluminum chloride is added and, thereafter, a further 0.22 mole methanol is added as rapidly as absorbed during 30 minutes; the reaction temperature rising from 225° to 240°C. during the addition as more methyl chloride and hydrogen chloride are evolved.

When gas evolution ceases, 0.006 mole HCPX is added and a mixture temperature of 225°C. is maintained for 20 minutes.

Thereafter, the mass can be simply distilled under a 50 mm Hg pressure to recover pure terephthaloyl chloride as distillate in high purity and yield.

The foregoing detailed description has been given for clarity of understanding only and no unnecessary limitations are to be understood therefrom. The invention is not limited to exact details shown and described for obvious modifications will occur to one skilled in the art.

What is claimed is:

1. Process for the preparation of a benzene carbonyl chloride of the formula

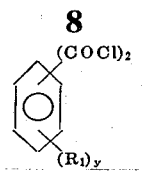

wherein $R_1$ is alkyl, Cl, Br or F and $y$ is 0–4, the COCl substituents being on nonadjacent carbon atoms of the benzene ring, which process comprises the steps:

a. reacting in a reaction mixture
1. a substituted benzene compound having $z_1$ $CCl_3$ groups, $z_1$ being 1–2, and 0–5 groups selected from COCl and $R_1$, the total number of $CCl_3$ and COCl groups being 2 and the 1–2 $CCl_3$ and any COCl groups being on nonadjacent carbon atoms of the benzene ring, and
2. for each mole of (1), $z_1(1+\mu)$ moles of a compound of the formula ROH wherein R is H or $C_{1-6}$ alkyl and $\mu$ is the amount in excess of the stoichiometric amount and is within the range 0.02–0.25, at a temperature sufficient to produce HCl and to convert the $z_1$ $CCl_3$ groups to carbonyl-containing groups; and b. thereafter adding to the reaction mixture $z_1\mu_1/z_2$ mole of a substituted benzene compound as defined in (1) except that the number of $CCl_3$ groups is $z_2$, $z_2$ being 1–2 and $\mu_1$ is 0.02 to $\mu$, said compound being the same as or different from that used in (a), and continuing the reaction until the reaction mixture is substantially free of compounds containing a $CCl_3$ group.

2. The process of claim 1 wherein $\mu$ is 0.03–0.10 and the number of moles of substituted benzene compound in (b) is 30–90 percent of $\mu_1$.

3. The process of claim 2 wherein the number of moles of substituted benzene compound in (b) is 40–60 percent of $\mu_1$.

4. The process of claim 1 wherein the substituted benzene compounds in (a) and (b) are the same.

5. The process of claim 1 wherein the benzene carbonyl chloride prepared from the reaction is recovered by distillation.

6. The process of claim 1 wherein the reactions are conducted in the presence of a polyvalent metal halide catalyst.

7. The process of claim 6 wherein the catalyst is antimony pentachloride in an amount of 0.05 to 0.5 mole percent based on the benzene substituted compound in (a).

8. The process of claim 1 wherein the benzene substituted compound in (a) is m-bis(trichloromethyl)benzene.

9. The process of claim 1 wherein the benzene substituted compound in (a) is 1,4-bis(trichloromethyl)benzene.

10. The process of claim 4 wherein the benzene substituted compounds are each 1,4-bis(trichloromethyl)-benzene and terephthaloyl chloride is prepared.

11. The process of claim 4 wherein the benzene substituted compounds are each m-bis(trichloromethyl)-benzene and the benzene carbonyl chloride prepared is isophthaloyl chloride.

12. The process of claim 11 wherein the isophthaloyl chloride is recovered by distillation.

* * * * *